(12) United States Patent
Davis

(10) Patent No.: US 6,464,436 B1
(45) Date of Patent: Oct. 15, 2002

(54) GREENSMOWER TRAILER

(75) Inventor: Michael E. Davis, Indianapolis, IN (US)

(73) Assignee: GreensGroomer Worldwide, Inc., Indianapolis, IN (US)

( * ) Notice: Subject to any disclaimer, the term of this patent is extended or adjusted under 35 U.S.C. 154(b) by 0 days.

(21) Appl. No.: 09/505,297

(22) Filed: Feb. 16, 2000

(51) Int. Cl.[7] .................................................. B60P 7/08
(52) U.S. Cl. .................................. 410/7; 410/3; 410/4
(58) Field of Search ............................. 410/2, 3, 4, 7, 410/9, 19, 22, 77, 80; 248/500, 503; 292/259 R, 289, 359; 414/537

(56) References Cited

U.S. PATENT DOCUMENTS

| | | | | |
|---|---|---|---|---|
| 3,025,985 A | * | 3/1962 | Crawford | 410/3 X |
| 3,672,523 A | * | 6/1972 | Albert | 410/3 X |
| 5,344,265 A | * | 9/1994 | Ullman et al. | 410/3 |
| 5,503,449 A | | 4/1996 | Cameron et al. | |
| 5,542,815 A | * | 8/1996 | Roeling | 410/3 X |
| 5,567,095 A | * | 10/1996 | James et al. | 410/7 |
| 5,795,115 A | * | 8/1998 | Collins | 410/22 |
| 5,816,757 A | * | 10/1998 | Huston | 410/3 |
| 5,833,412 A | * | 11/1998 | Valenica et al. | 410/2 |
| 5,879,114 A | * | 3/1999 | Spence | 410/77 |
| 6,019,566 A | * | 2/2000 | Thier et al. | 410/3 X |
| 6,036,417 A | * | 3/2000 | Weaver | 410/7 |
| 6,099,219 A | * | 8/2000 | Bartholomay | 410/20 |
| 6,109,494 A | * | 8/2000 | Pilmore | 410/3 X |
| 6,382,891 B1 | * | 5/2002 | Bellis, Jr. | 410/7 |

* cited by examiner

Primary Examiner—Stephen T. Gordon
(74) Attorney, Agent, or Firm—Woodard, Emhardt, Naughton, Moriarty & McNett

(57) ABSTRACT

A trailer for transporting a greensmower over a golf course. A deck of the trailer supports the greensmower, and a universal coupler of the trailer secures the greensmower to the deck. When the greensmower is secured to the deck, a rear driver roller of the greensmower abuts the deck, and a cutting reel drive, a bed knife, a front roller, and a grass conditioning roller of the greensmower suspend above the deck. A pair of wheels are rotatably coupled to the deck, and a pair of bumpers extend from the deck to deflect objects away from the wheels and associated wheel axles. A ramp support slidably adjoins a ramp to the deck, and the ramp is movable along the ramp support between a retracted position and an extended position. A ramp prop is adjoined to the deck to uphold a portion of the ramp adjacent the deck when the ramp is in the extended position. The universal coupler includes a latch assembly adjoined to the deck and a plurality of braces. Each brace is securable within one or more expandable slots of the latch assembly. Each brace is constructed to be adjoined to a specific set of one or more models of greensmowers. Optionally, axle supports can be adjoined to the deck to shield and/or support the axles of a secured greensmower, or wheel supports can be adjoined to the deck to seat the wheels of a secured greensmower.

11 Claims, 15 Drawing Sheets

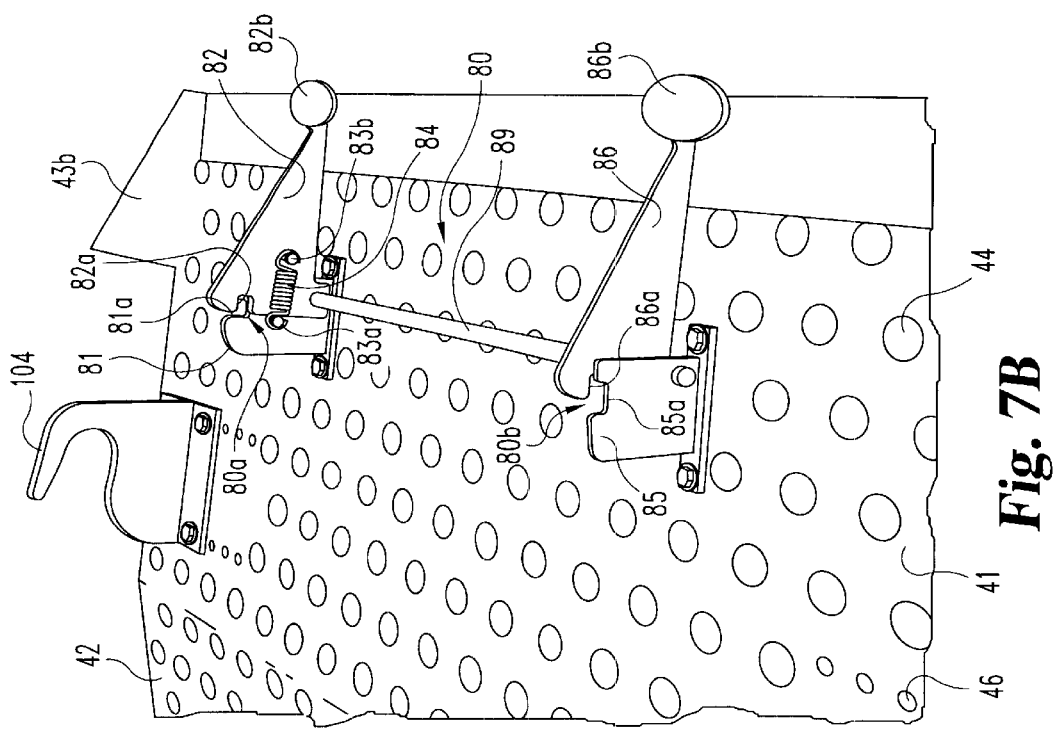
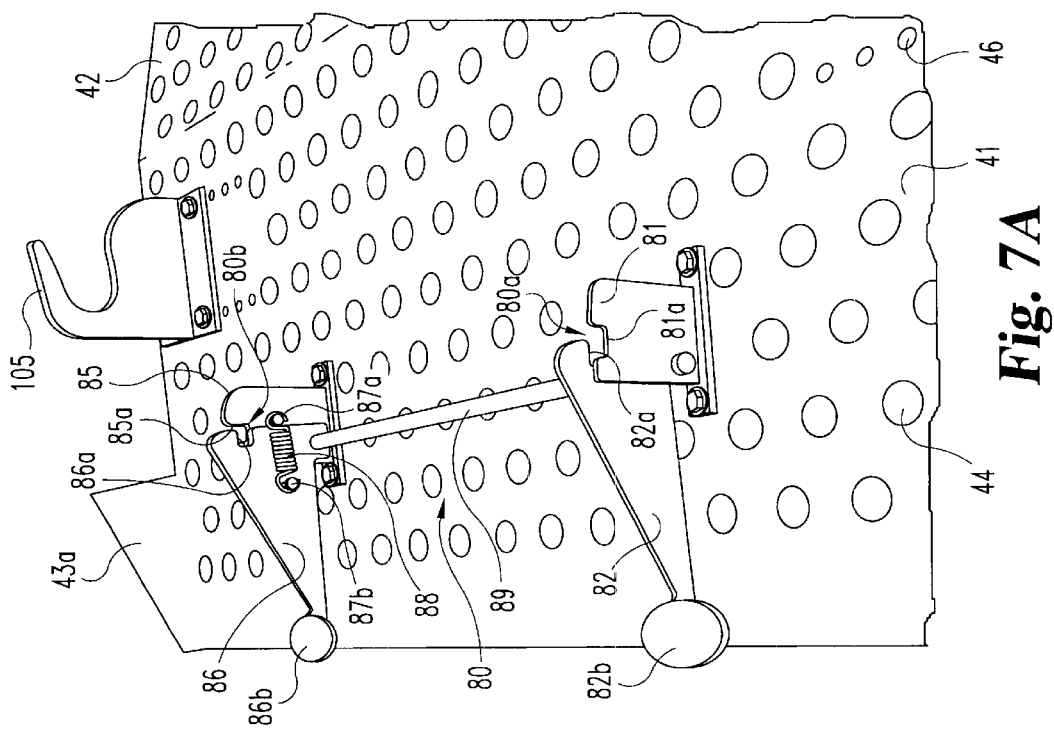
Fig. 7A
Fig. 7B

GREENSMOWER TRAILER

BACKGROUND OF THE INVENTION

1. Field of the Invention

The present invention generally relates to trailers, and more specifically relates to a trailer for transporting walk-behind greensmowers.

2. Description of the Prior Art

A conventional walk-behind greensmower 10 is shown in FIGS. 1A and 1B. Referring to FIGS. 1A and 1B, walk-behind greensmower 10 comprises an engine 11 and an intermediary drive mechanism 12, both supported by a frame 13. Intermediary drive mechanism 12 interconnects engine 11 with a rear drive roller 14. A wheel axle 15a and a wheel axle 15b extend into rear drive roller 14 with a wheel 16a being removably mounted to wheel axle 15a, and a wheel 16b being removably mounted to wheel axle 15b. Intermediary drive mechanism 12 also interconnects engine 11 with a cutting reel drive 17, and a leading edge of a bed knife 18 is positioned adjacent to cutting reel drive 17. A free-wheeling front roller 19 is rotatably mounted to a front end of frame 13, and a vertical adjustment mechanism (not shown) enables a user of greensmower 10 to raise or lower front roller 19 relative to frame 13. A free-wheeling grass conditioning roller 20 is also rotatably mounted to a front end of frame 13, and an additional vertical adjustment mechanism (not shown) enables a user of greensmower 10 to raise or lower grass conditioning roller 20 relative to frame 13.

One type of trailer known in the art for transporting greensmower 10 secures greensmower 10 to the trailer by clamping frame 13, wheel axle 15a after wheel 16a has been dismounted from wheel axle 15a, and wheel axle 15b after wheel 16b has been dismounted from wheel axle 15b. Frame 13, wheel axle 15a, and wheel axle 15b are clamped in a manner that abuts front roller 19 against the trailer bed, and suspends rear drive roller 14, cutting reel drive 17, bed knife 18, and grass conditioning roller 20 above the trailer bed. A disadvantage with the clamping type of prior art trailers for greensmower 10 is the clamps are constructed, dimensioned, and positioned on the trailer bed as a function of the specific construction and dimensions of greensmower 10. As a result, it is impractical to utilize a clamping type trailer for greensmower 10 to transport an alternative model of greensmowers having a dissimilar construction and/or significantly different dimensions. Consequently, a maintenance crew for a golf course must maintain a separate clamping type trailer for each procured model of greensmower, and therefore the overall cost for maintaining a golf course can therefore be significantly inflated. Another disadvantage is the inability to minimize, if not prevent, an alteration in an alignment of one or both vertical adjustment mechanisms of greensmower 10 as greensmower 10 is being transported due to the abutment of front roller 19 with the trailer bed and sporadic contact between grass conditioning roller 20 and the trailer bed.

Another type of trailer known in the art for transporting greensmower 10 has a bedliner positioned within a cargo box of a trailer. The bedliner is configured to seat wheel axle 15a and wheel axle 15b after wheels 16a and 16b have been dismounted therefrom, respectively. With this seating arrangement, front roller 19 abuts the floor of the bedliner, and rear drive roller 14, cutting reel drive 17, bed knife 18, and grass conditioning roller 20 are suspended above the floor of the bedliner. A disadvantage with the seating types of prior art trailers for greensmower 10 is the wheel axle seats are constructed, dimensioned, and positioned on the bedliner as a function of the specific construction and dimensions of greensmower 10. As a result, it is impractical to utilize a bedliner for greensmower 10 to transport an alternative model of greensmowers having a dissimilar construction and/or significantly different dimensions. Consequently, a maintenance crew for a golf course must maintain a separate bedliner for each procured model of greensmower, and the overall cost for maintaining a golf course can therefore be significantly inflated. Another disadvantage is the inability to minimize, if not prevent, an alteration in an alignment of one or both vertical adjustment mechanisms of greensmower 10 as greensmower 10 is being transported due to the abutment of front roller 19 with the floor of the bedliner and sporadic contact between grass conditioning roller 20 and the floor of the bedliner.

Therefore, there is a primary need for a greensmower trailer that can be utilized to transport any model of greensmower. There is also a secondary need for a greensmower trailer that minimizes, if not prevents, an alteration in an alignment of one or both vertical adjustment mechanisms of a transported greensmower.

SUMMARY OF THE INVENTION

The present invention is a greensmower trailer that addresses the aforementioned drawbacks associated with the prior art. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

One embodiment of the present invention is a trailer for transporting a variety of models of greensmowers comprising a deck and a universal coupler. The deck supports a greensmower. The universal coupler secures the greensmower to the deck, and includes a latch assembly and a brace. The latch assembly is adjoined to the deck, and the brace is securable by the latch assembly. The brace is constructed to be adjoined to a first set of one or more models of greensmowers.

Another embodiment of the present invention is a trailer for transporting a variety of models of greensmowers comprising a deck and a universal coupler. The deck supports a greensmower, and includes a first portion and a second portion rearwardly and downwardly extending from the first portion. The universal coupler is adjoined to the deck and is constructed to be adjoined to the greensmower for securing the greensmower to the deck. A rear driver roller of the greensmower abuts the first portion of the deck when the greensmower is secured to the deck. A cutting reel drive, a bed knife, a front roller, and a grass condition roller of the greensmower are suspended above the second portion of the deck when the greensmower is secured to the deck.

Yet another embodiment of the present invention is a trailer for transporting a variety of models of greensmower comprising a deck, a universal coupler, a first wheel, a first bumper, a second wheel, and a second bumper. The deck supports a greensmower. The universal coupler is adjoined to the deck and is constructed to be adjoined to the greensmower for securing the greensmower to the deck. The first wheel and the second wheel are rotatably adjoined to the deck. The first bumper is adjoined to the deck and adjacent a tread of the first wheel. The second bumper is adjoined to the deck and adjacent a tread of the second wheel.

Yet another embodiment of the present invention is a trailer for transporting a variety of models of greensmower comprising a deck, a universal coupler, a ramp, and a ramp prop. The deck supports a greensmower. The universal coupler is adjoined to the deck and is constructed to be adjoined to the greensmower for securing the greensmower to the deck. The ramp is slidably adjoined to the deck, and is movable between a retracted position and an extended position. The ramp prop is adjoined to the deck, and upholds a portion of the ramp adjacent the deck when the ramp is in the extended position.

It is an object of the present invention to provide a novel and unique trailer for transporting a variety of models of greensmowers.

Related objects and advantages of the present invention will be apparent from the following description of the preferred embodiment.

BRIEF DESCRIPTION OF THE DRAWINGS

FIG. 7A is a top and right side perspective view of one embodiment of a latch assembly in accordance with the present invention.

FIG. 7B is a top and left side perspective view of the FIG. 7A latch assembly.

DESCRIPTION OF THE PREFERRED EMBODIMENT

Figure 1A:
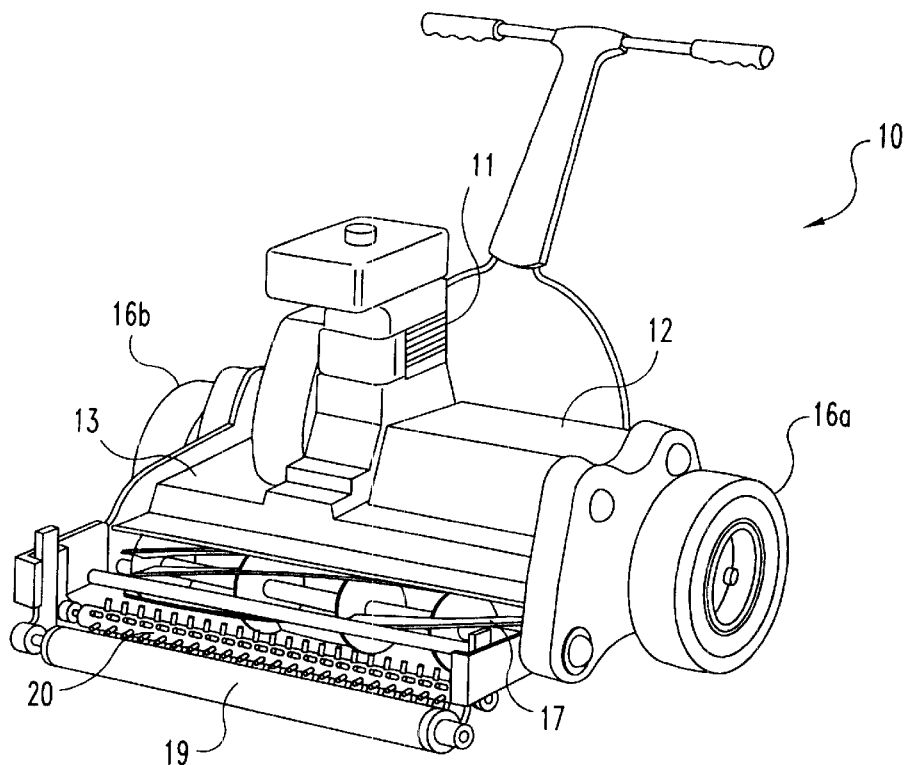
FIG. 1A is a front, top, and right side perspective view of a first embodiment of a conventional greensmower.
Figure 1B:
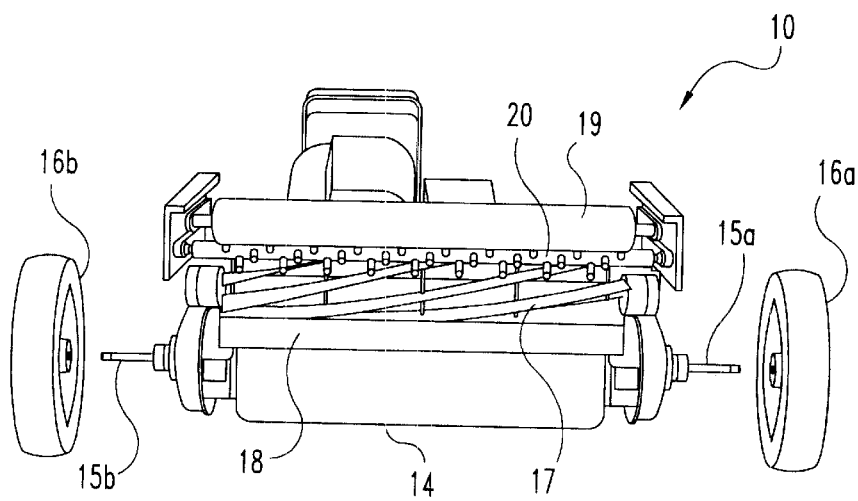
FIG. 1B is a front and bottom perspective view of the FIG. 1A greensmower.

For the purposes of promoting an understanding of the principles of the present invention, reference will now be made to the preferred embodiment of the present invention as illustrated in the drawings and specific language will be used to describe the same. It will nevertheless be understood that no limitation of the scope of the present invention is thereby intended. Any alterations and further modifications in the illustrated embodiments, and any further applications of the principles of the present invention as illustrated and described herein are contemplated as would normally occur to one skilled in the art to which the present invention relates. For purposes of the present invention, the term adjoined is defined as a unitary fabrication, an affixation, a coupling, a removable mounting, an engagement, or an abutment of two or more components of any embodiment of a greensmower trailer in accordance with the present invention.

Figure 2A:
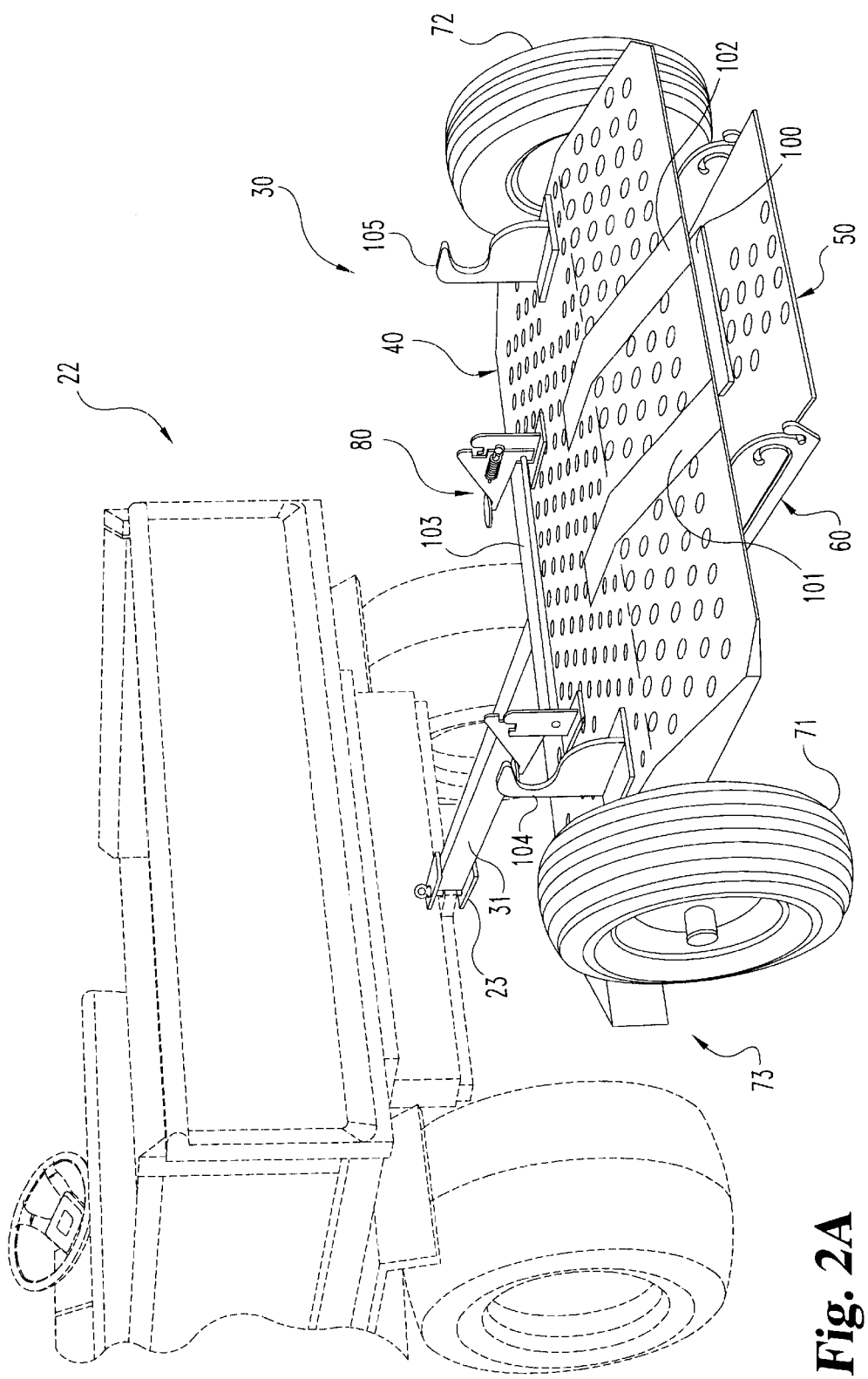
FIG. 2A is a rear, top and right side perspective view of a first embodiment of a trailer in accordance with the present invention for transporting a variety of models of greensmowers.
Figure 2B:
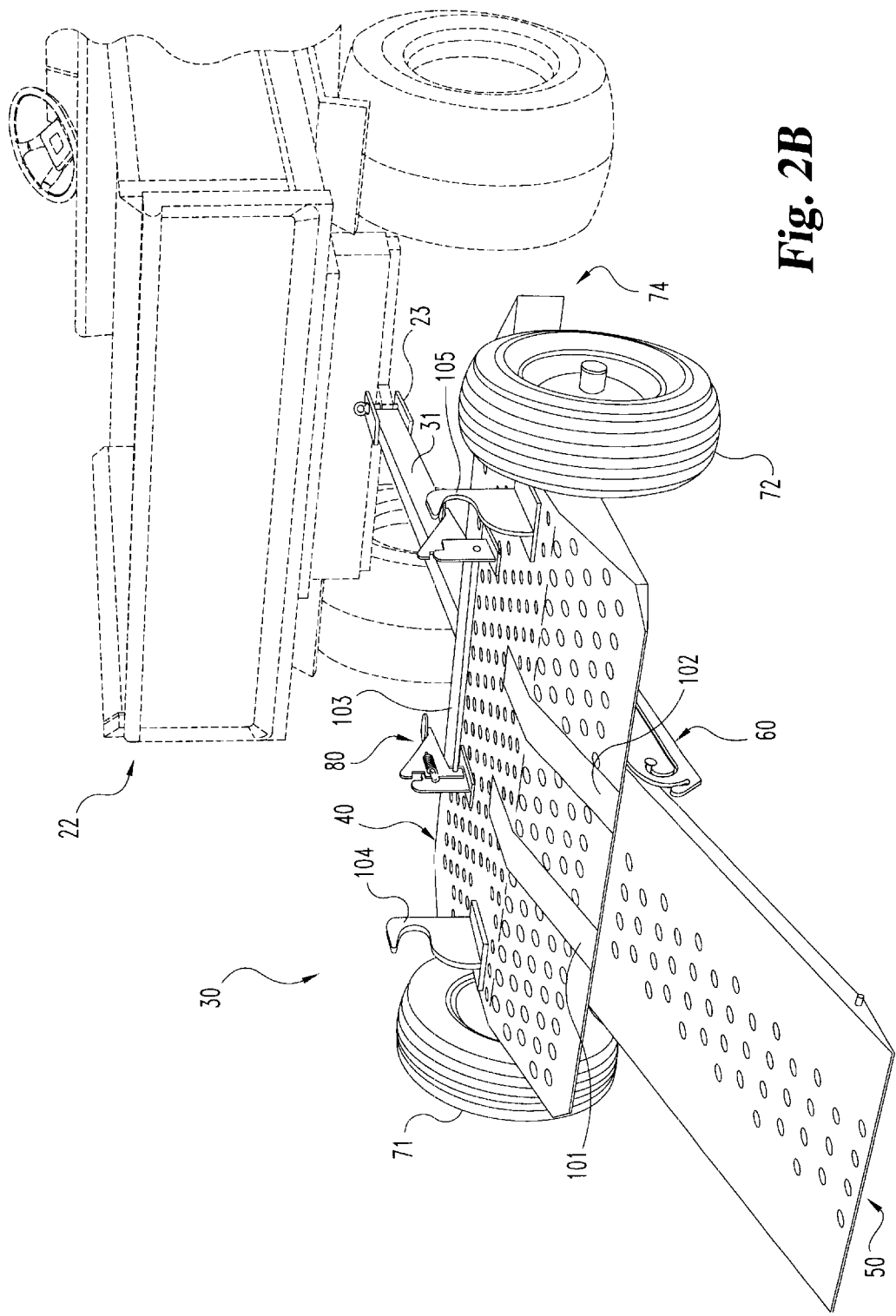
FIG. 2B is a rear, top, and left side perspective view of the FIG. 2A trailer.

Referring now more particularly to FIGS. 2A and 2B, there is shown one embodiment of a trailer 30 in accordance with the present invention. Trailer 30 is detachably adjoined to and towed by a conventional powered vehicle 22. The present invention contemplates that vehicle 22 may be a gasoline powered or battery operated cart or tractor. Vehicle 22 includes a conventional trailer hitch 23 provided on the rear of vehicle 22, and trailer 30 includes a tow bar 31 detachably coupled to hitch 23 in a conventional manner as shown. Vehicle 22 is operable to move trailer 30 across a green, a fairway, a walkway, and a bridge as located on a golf course.

Figure 8A:
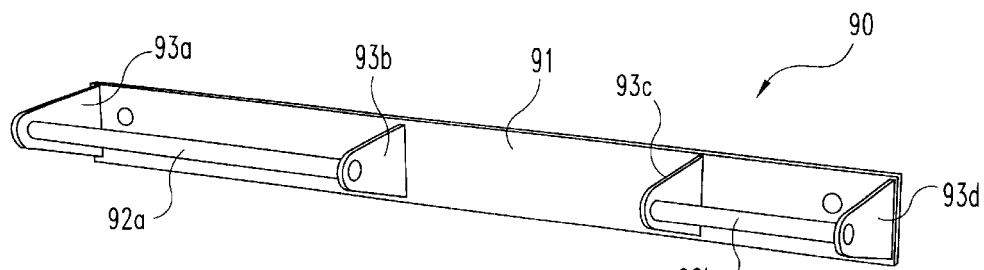
FIG. 8A is a rear, top, and left side perspective view of a first embodiment of a brace in accordance with the present invention.

Trailer 30 comprises a deck 40 for supporting a greensmower, a ramp 50, a right wheel 71, a left wheel 72, a right bumper 73, and a left bumper 74. Ramp 50 is slidably adjoined to deck 40, and is movable between a retracted position as shown in FIG. 2A and an extended position as shown in FIG. 2B. Right wheel 71 and left wheel 72 are rotatably adjoined to a right side and a left side of deck 40, respectively. Right bumper 73 is adjoined to the right side of deck 40 and is adjacent a tread of right wheel 71 to deflect trees, signs, etc. away from right wheel 71 and an associated wheel axle as vehicle 22 moves trailer 30. Left bumper 74 is adjoined to the left side of deck 40 and is adjacent a tread of left wheel 72 to deflect trees, signs, etc. away from left wheel 72 and an associated wheel axle as vehicle 22 moves trailer 30. Trailer 30 also comprises a universal coupler for securing a greensmower to deck 40. The universal coupler includes a latch assembly 80 adjoined to deck 40. The universal coupler further includes one or more braces (not shown) that are securable by latch assembly 80. A brace 90 (FIG. 8A), a brace 94 (FIG. 8B), and a brace 97 (FIG. 8C) are a few embodiments of a brace in accordance with the present invention.

Figure 3A:
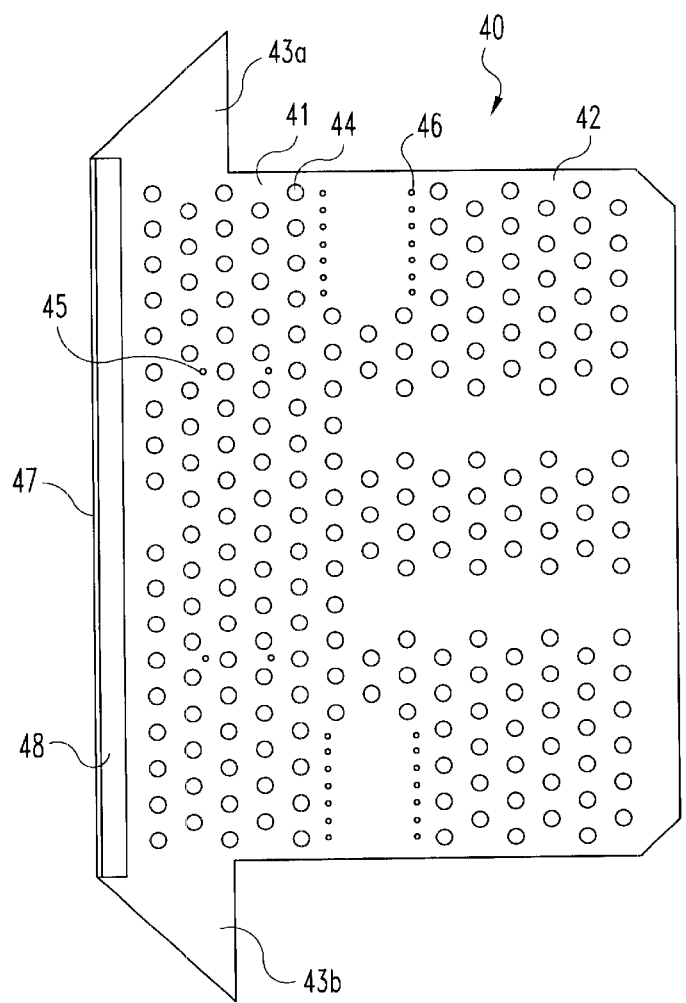
FIG. 3A is a bottom plan view of one embodiment of a deck in accordance with the present invention.
Figure 3B:
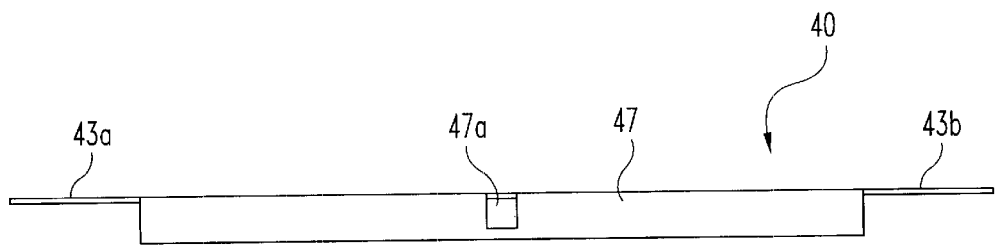
FIG. 3B is a front plan view of the FIG. 3A deck.
Figure 3C:
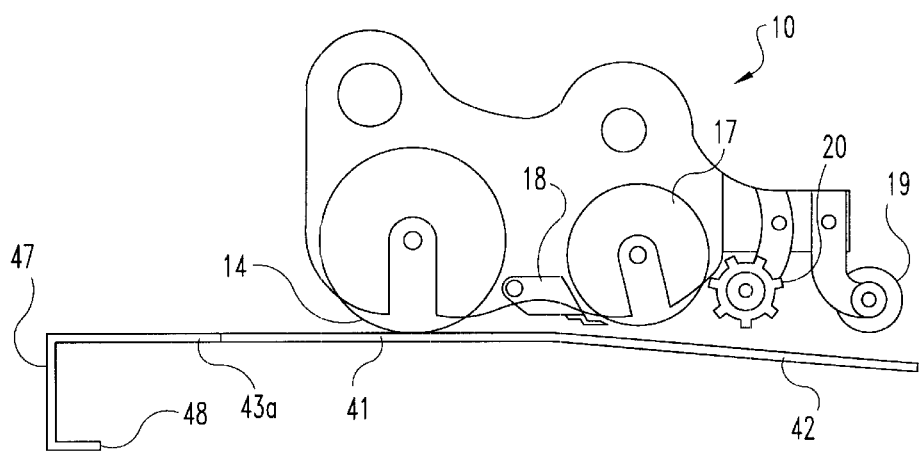
FIG. 3C is a diagrammatic view of the FIG. 1A greensmower being supported by the FIG. 3A deck.

Referring to FIGS. 3A and 3C, deck 40 includes a first portion 41 having a generally planar and rectangular configuration, and a second planar portion 42 having a generally planar and rectangular configuration. Portion 42 is rearwardly and downwardly extended from portion 41 as best shown in FIG. 3C. The universal coupler (not shown) of the present invention secures greensmower 10 to deck 40 in a generally parallel alignment with portion 41 whereby rear drive roller 14 of greensmower 10 abuts portion 41, and cutting reel drive 17, bed knife 18, front roller 19, and grass conditioning roller 20 of greensmower 10 are suspended above portion 42 as shown in FIG. 3C. It is to be appreciated with this arrangement of greensmower 10 upon deck 40 that damage to cutting reel drive 17 and bed knife 18 due to physical contact with deck 40 as trailer 30 (FIGS. 2A and 2B) is being transported by vehicle 22 (FIGS. 2A and 2B) is prevented. It is also to be appreciated that any alteration in an alignment of the vertical adjustment mechanisms (not shown) of greensmower 10 by physical contact of front roller 19 and/or grass conditioning roller 20 with deck 40 as trailer 30 is being transported by vehicle 22 is prevented.

Referring to FIG. 3A, a right wing 43a and a left wing 43b are preferably unitarily fabricated with portion 41 as shown to facilitate a user of trailer 30 stepping up upon portion 41 as needed and stepping down from portion 41 as needed. A plurality of holes 44 extend along portion 41 and portion 42. Holes 44 enable a user of trailer 30 to quickly and easily wash away any grass and any dirt disposed upon a top surface of portion 41 and/or a top surface of portion 42 when cleaning trailer 30. Portion 41 has holes 45 that enable a user of trailer 30 to removably mount latch assembly 80 (FIGS. 2A and 2B) to portion 41 of deck 40. Portion 41 also has holes 46 that enable a user of trailer 30 to removably mount right wheel 71 and left wheel 72 to deck 40. Holes 46 also enable a user of trailer 30 to removably mount either a right axle support 104 and a left axle support 105 (FIGS. 2A and 2B) to deck 40, or to removably mount a right wheel support 106 and a left wheel support 107 (FIG. 11) to deck 40.

Referring to FIGS. 3A–3C, a front plate 47 is preferably unitarily fabricated with a front edge of deck 40 and perpendicularly and downwardly extended therefrom. Tow bar 3 1 (FIGS. 2A and 2B) preferably extends through a hole 47a in front plate 47 and is removably mounted to front plate 47 in a conventional manner. The present invention contemplates that tow bar 31 can be telescopic to enable an adjusting of a distance between vehicle 22 and deck 40. A rim 48 is preferably unitarily fabricated with a bottom edge of front plate 47, and perpendicularly and rearwardly extended therefrom.

Figure 4A:
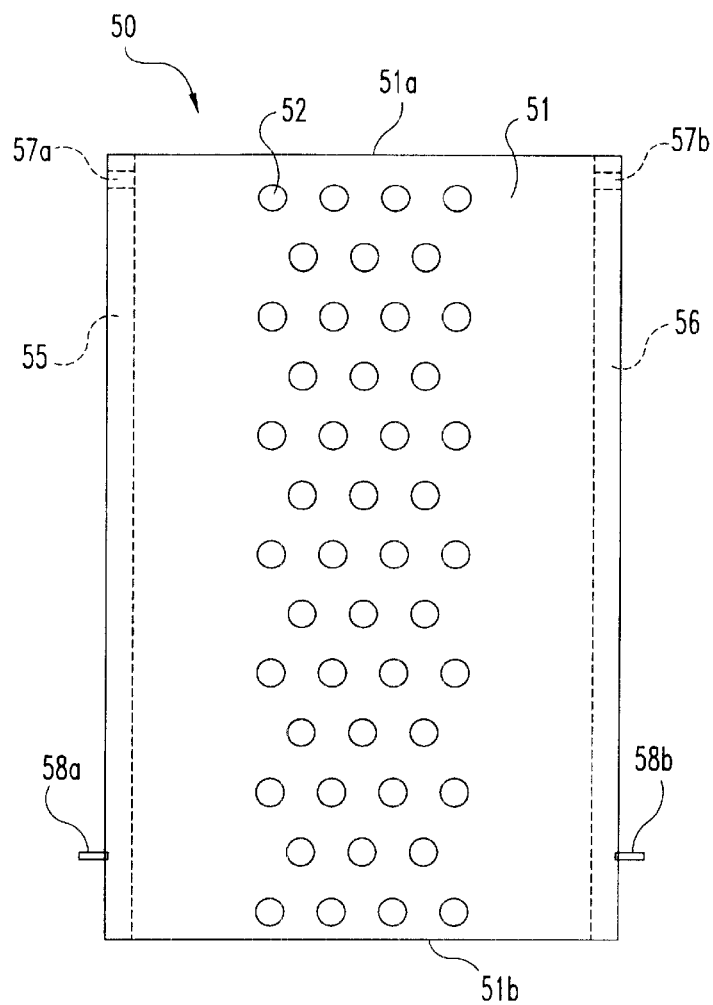
FIG. 4A is a top plan view of one embodiment of a ramp in accordance with the present invention.
Figure 4C:
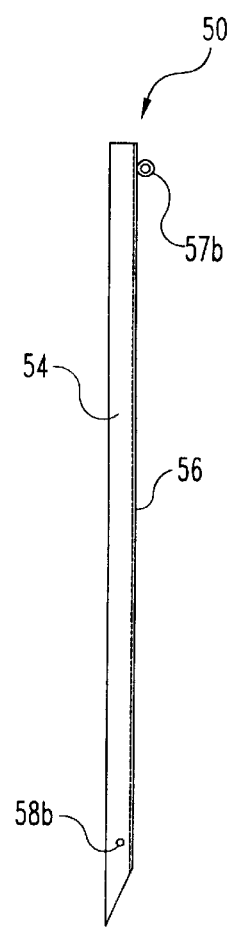
FIG. 4C is a left side view of the FIG. 4A ramp.
Figure 4B:
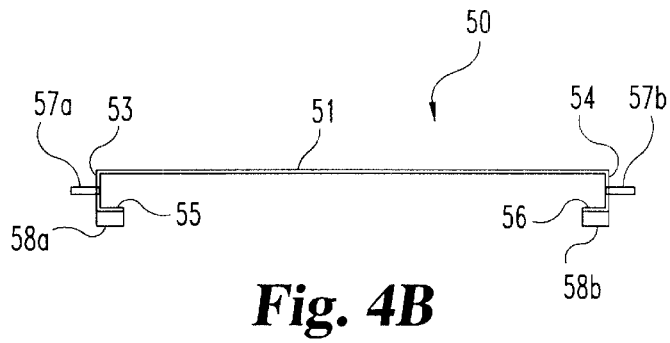
FIG. 4B is a rear plan view of the FIG. 4A ramp.

Referring to FIGS. 4A–4C, ramp 50 includes a platform 51, a right tubular appendage 57a, a left tubular appendage 57b, a right peg 58a, and a left peg 58b. Platform 51 has a generally planar and rectangular configuration. A plurality of holes 52 extend along platform 51 from a front end 51a to a rear end 51b to enable a user of trailer 30 to quickly and easily wash away any grass and any dirt disposed upon a top side surface of platform 51 when cleaning trailer 30 (FIGS. 2A and 2B). A right plate 53 is preferably unitarily fabricated with a right side edge of platform 51, and perpendicularly and downwardly extended therefrom. Right peg 58a is preferably affixed to and perpendicularly extended from right plate 53 adjacent rear end 51b of platform 51. A left plate.54 is preferably unitarily fabricated with a left side edge of platform 51, and perpendicularly and downwardly extended therefrom. Left peg 58b is preferably affixed to and perpendicularly extended from left plate 54 adjacent rear end 51b of platform 51. A right rim 55 is preferably unitarily fabricated with a bottom edge of right plate 53 and perpendicularly and inwardly extended therefrom. Tubular appendage 57a is preferably affixed to and parallelly aligned with right rim 55 adjacent front end 51a of platform 51. A left rim 56 is preferably unitarily fabricated with a bottom edge of left plate 54 and perpendicularly and inwardly extended therefrom. Tubular appendage 57b is preferably affixed to and parallelly aligned with left rim 56 adjacent front end 51a of platform 51.

Figure 5A:
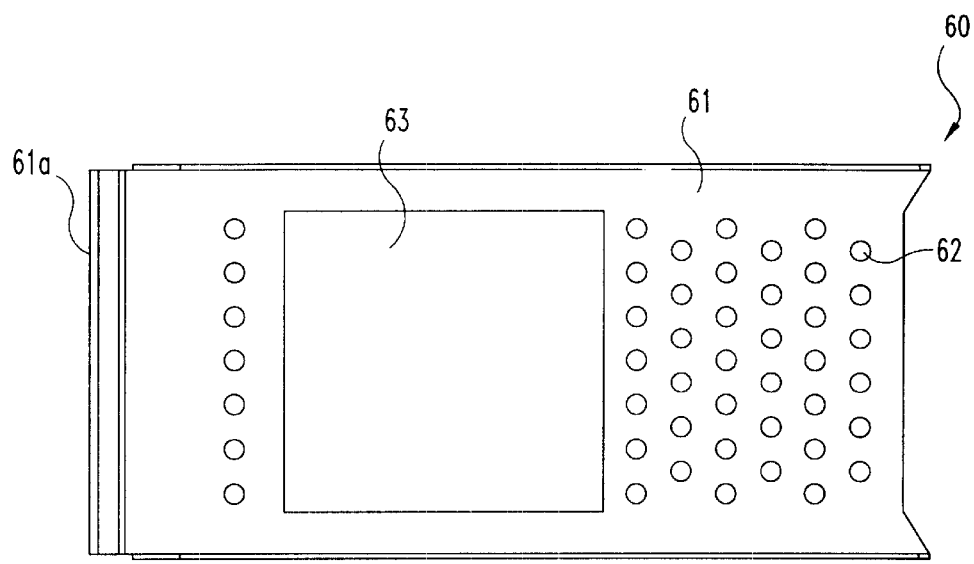
FIG. 5A is a bottom plan view of one embodiment of a ramp support in accordance with the present invention.
Figure 5B:
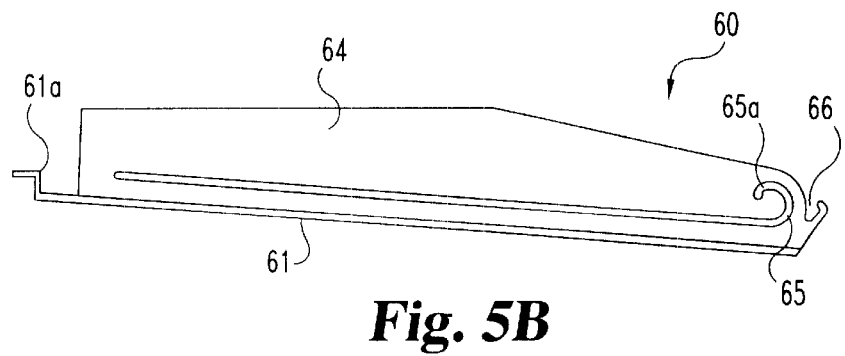
FIG. 5B is a right side view of the FIG. 5A ramp support.
Figure 5C:
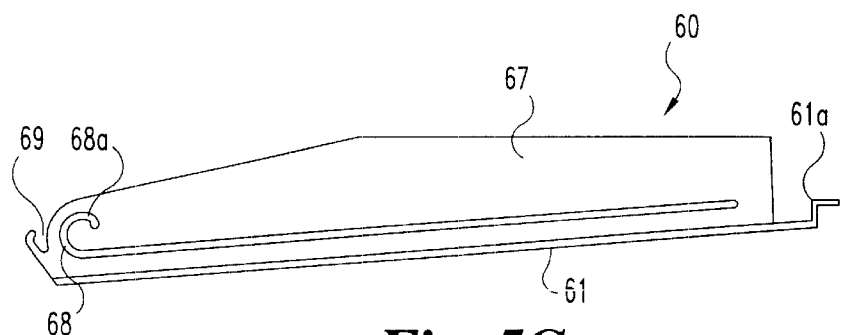
FIG. 5C is a left side view of the FIG. 5A ramp support.

Referring to FIGS. 5A–5C, trailer 30 further includes a ramp support 60 for slidably adjoining ramp 50 (FIGS. 4A–4C) to deck 40 (FIGS. 3A–3C). Ramp support 60 includes a base 61, a right side wall 64, and a left side wall 67 that are preferably fabricated as a unitary member. Base 61 has a generally planar and rectangular configuration with a forward flange 61a extending from a front end of base 61. A plurality of holes 62 extend over base 61 to enable a user. of trailer 30 to quickly and easily wash away any grass and any dirt disposed upon a top side surface of base 61 when cleaning trailer 30 (FIGS. 2A and 2B). Base 61 also has an opening 63 to provide access to a portion of a bottom surface of deck 40 above base 61. Right side wall 64 upwardly extends from a right side edge of base 61. A groove 65 longitudinally extends from a front end of right side wall 64 to a rear end of right side wall 64 where groove 65 makes a loop 65a. A notch 66 is positioned in a rear end of right side wall 64. Left side wall 67 upwardly extends from a left side edge of base 61. A groove 68 longitudinally extends from a front end of left side wall 67 to a rear end of left side wall 67 where groove 68 makes a loop 68a. A notch 69 is positioned in a rear end of left side wall 67.

Figure 6A:
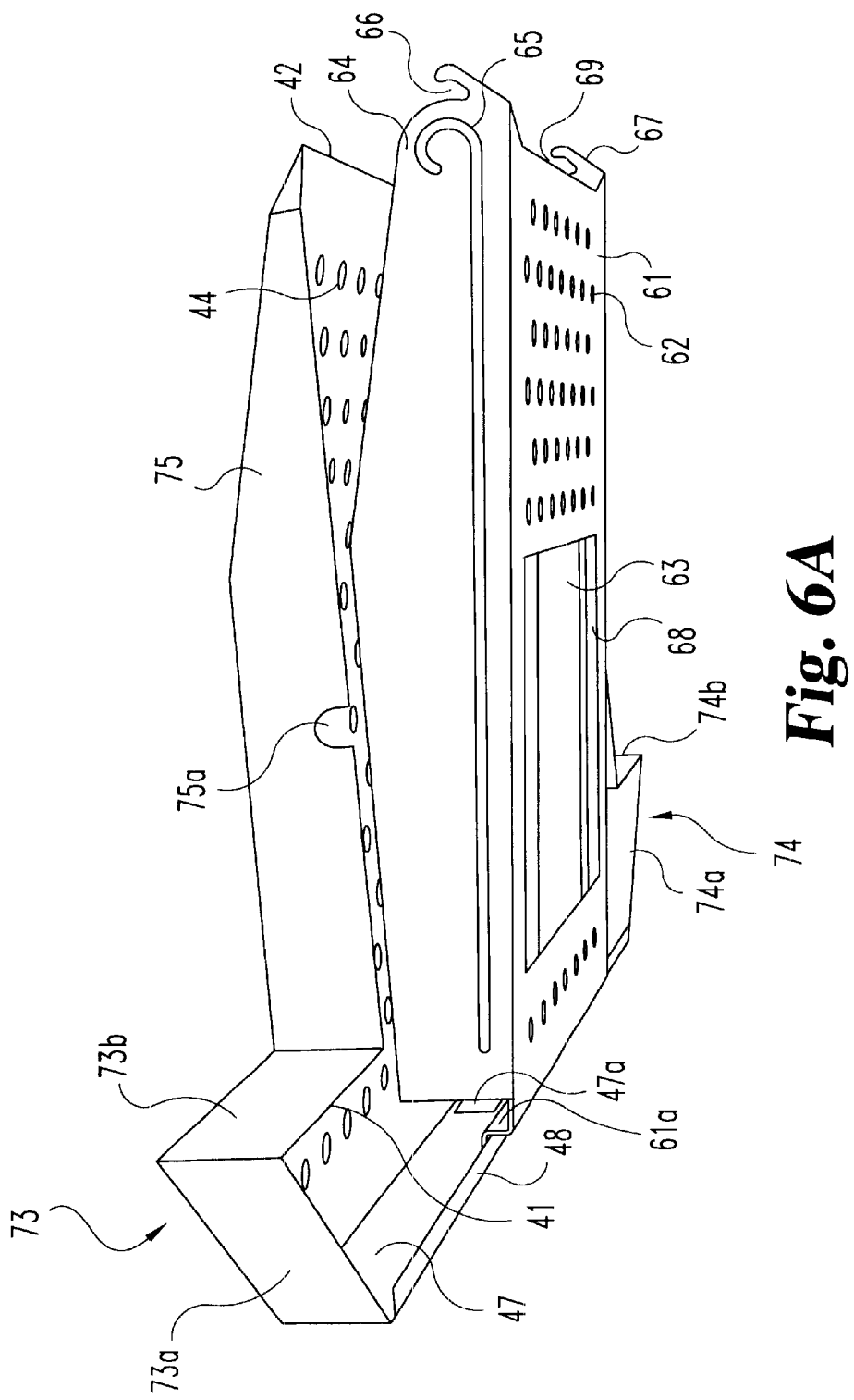
FIG. 6A is bottom and right side perspective view of an assembly of the FIG. 3A deck and the FIG. 5A ramp support.
Figure 6B:
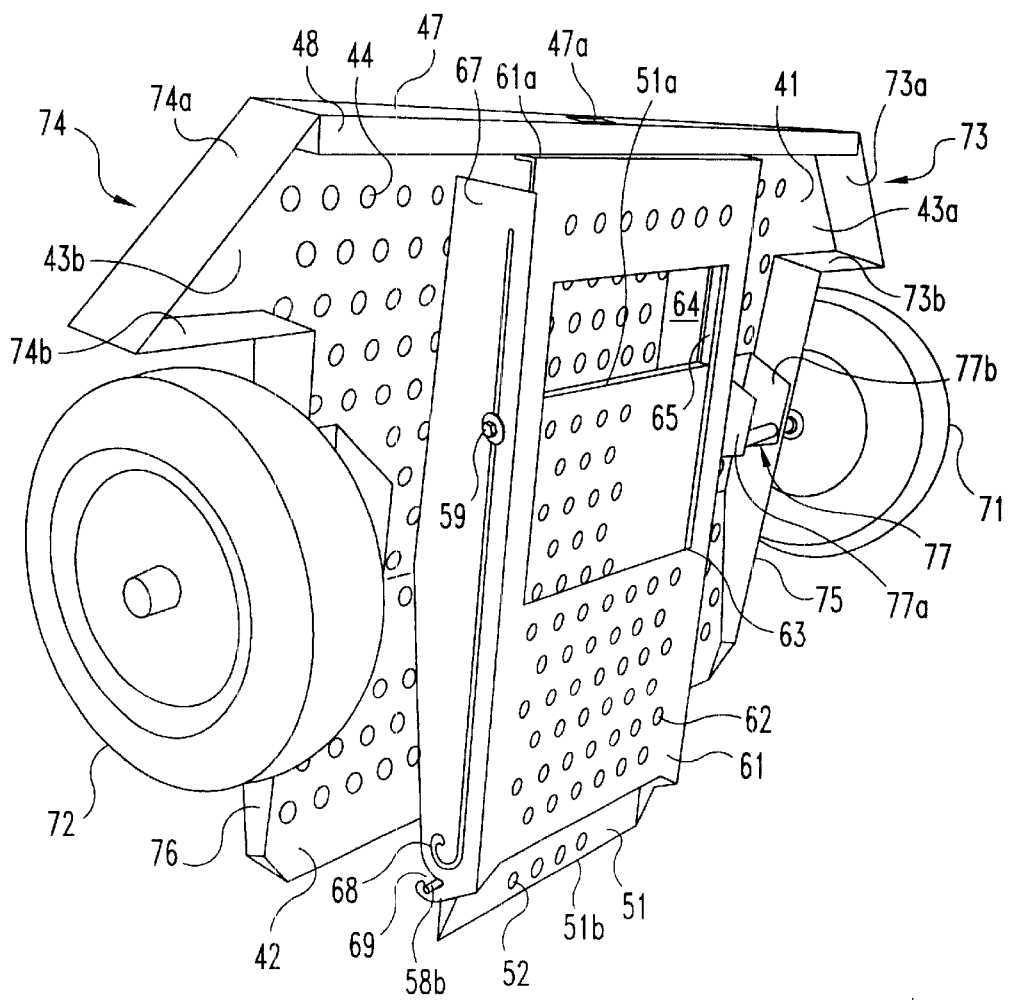
FIG. 6B is a bottom and left side perspective view of an assembly of the FIG. 3A deck, the FIG. 4A ramp, and the FIG. 5A ramp support.
Figure 6C:
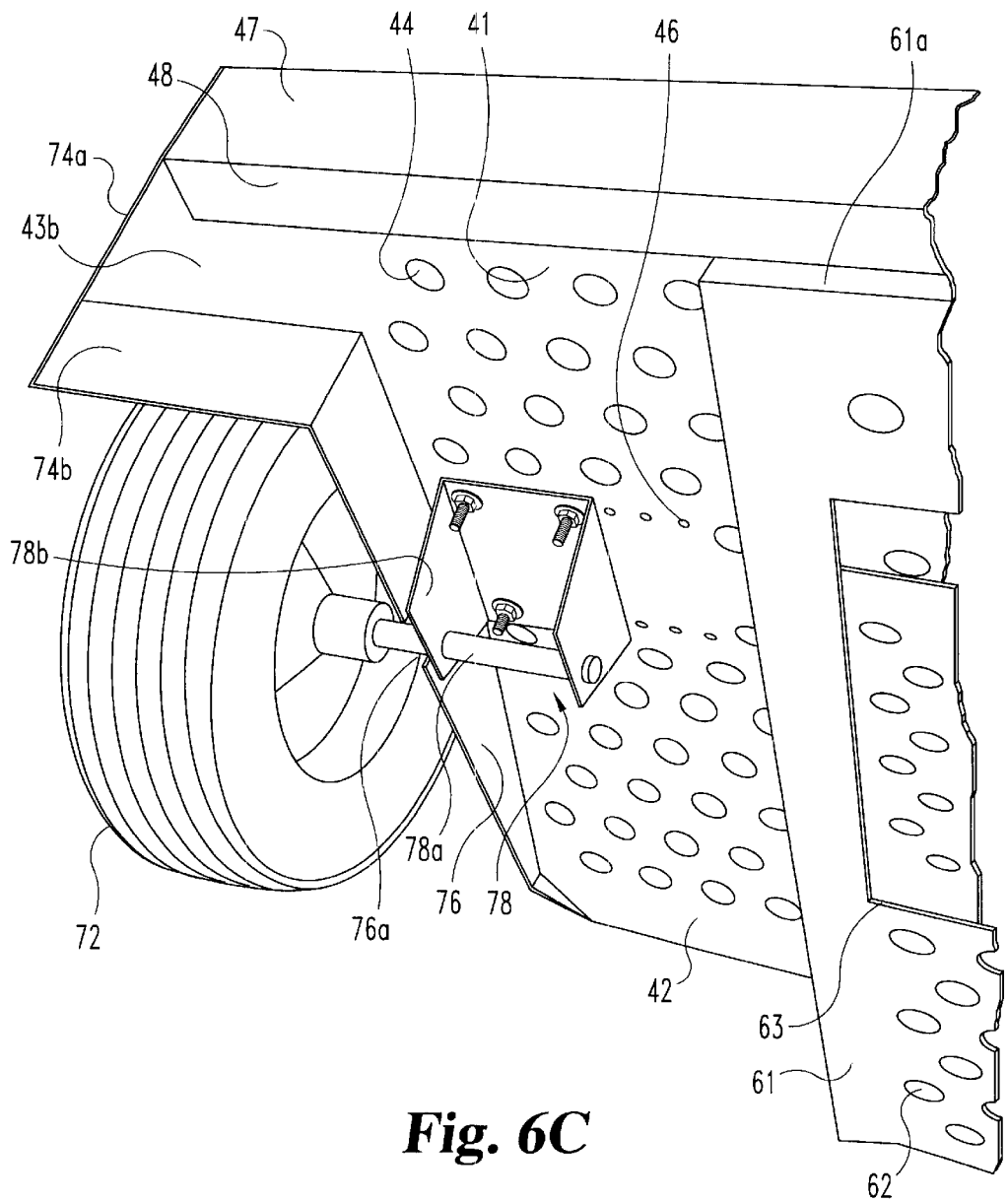
FIG. 6C is a partial front and bottom perspective view of a left side of the FIG. 6B assembly.

Referring to FIGS. 6A–6C, ramp support 60 is adjoined to deck 40 by forward flange 61a being preferably affixed to rim 48 as best shown in FIG. 6A, a top edge of right side wall 64 being preferably affixed to a bottom surface of portion 41 as best shown in FIG. 6A, and a top edge of left side wall 67 being preferably affixed to the bottom surface of portion 41 as best shown in FIG. 6C. Ramp 50 is slidably adjoined to ramp support 60 and in turn is slidably adjoined to deck 40 by a clevis pin 59 being preferably affixed to tubular appendage 57b (FIGS. 4A–4C) and extended through groove 68, and a clevis pin (not shown) preferably affixed to tubular appendage 57a (FIGS. 4A and 4B) and extended through groove 65. Right bumper 73 has a front plate 73a preferably affixed to a front edge of right wing 43a and perpendicularly and downwardly extended therefrom, and preferably affixed to a right side edge of front plate 47 and angularly and rearwardly extended therefrom as best shown in FIG. 6B. Right bumper 73 further has a rear plate 73b preferably affixed to a rear edge of right wing 43a and perpendicularly and downwardly extended therefrom, and preferably affixed to a rear edge of front plate 73a and angularly and inwardly extended therefrom as best shown in FIG. 6B. Rear plate 73b is parallel to a tread of right wheel 71. Left bumper 74 has a front plate 74a preferably affixed to a front edge of left wing 43b and perpendicularly and downwardly extended therefrom, and preferably affixed to a left side edge of front plate 47 and angularly and rearwardly extended therefrom as best shown in FIG. 6A. Left bumper 74 further has a rear plate 74b preferably affixed to a rear edge of left wing 43b and perpendicularly and downwardly extended therefrom, and preferably affixed to a rear edge of front plate 74a and angularly and inwardly extended therefrom as best shown in FIG. 6A. Rear plate 74b is parallel to a tread of left wheel 72.

Still referring to FIGS. 6A–6C, a right side plate 75 has a top edge preferably affixed to the right side edges of portion 41 and portion 42 of deck 40, and is perpendicularly and downwardly extended therefrom. Right side plate 75 includes a notch 75a upwardly positioned from a bottom edge of right side plate 75. A right wheel axle assembly 77 as best shown in FIG. 6B includes a right wheel axle 77a and a right axle bracket 77b, both removably mounted to deck 40 via holes 46. Right wheel axle 77a is affixed to right axle bracket 77b and is positioned within notch 75a. Right wheel 71 is preferably rotatably coupled to right wheel axle 77a. A left side plate 76 has a top edge preferably affixed to the left side edges of portion 41 and portion 42 of deck 40, and is perpendicularly and downwardly extended therefrom. Left side plate 76 includes a notch 76a upwardly positioned from a bottom edge of left side plate 76. A left wheel axle assembly 78 as best shown in FIG. 6B includes a left wheel axle 78a and a left axle bracket 78b, both removably mounted to deck 40 via holes 46. Left wheel axle 78a is affixed to left axle bracket 78b and is positioned within notch 76a. Left wheel 72 is preferably rotatably coupled to left wheel axle 78a.

Referring to FIGS. 2A and 2B, it is to be appreciated that a user of trailer 30 can move ramp 50 between a retracted position as shown in FIG. 2A and an extended position as shown in FIG. 2B by grasping ramp 50 adjacent rear end 51b (FIG. 4A). Ramp 50 is placed in the retracted position by a user of trailer 30 grasping ramp 50 and sliding ramp 50 toward a front end of ramp support 60, and then positioning right peg 58a (FIGS. 4A and 4B) into notch 66 (FIGS. 5A–5C) of ramp support 60 and left peg 58b (FIGS. 4A–4C) into notch 69 (FIGS. 5A–5C) of ramp support 60. Ramp 50 is placed in the extended position by a user of trailer 30 grasping ramp 50 and sliding ramp 50 toward a rear end of ramp support 60, and then positioning a front end portion of ramp 50 upon a ramp prop 100. Ramp prop 100 is preferably affixed to a bottom side surface of deck 40 adjacent the rear end of deck 40, and is utilized to uphold front end 51a (FIG.4A) of ramp 50 adjacent the rear end of deck 40.

Still referring to FIGS. 2A and 2B, deck 40 is preferably manufactured from steel and then given a powder coated finish. As such, to minimize a slipping and sliding of a rear roller of a greensmower positioned on the top surface of deck 40 when the greensmower is being pulled up upon portion 41 or pushed down from portion 4, trailer 30 can further include a strip of sandpaper 101 and a strip of sandpaper 102 affixed on a top surface of deck 40 extending from portion 42 to portion 41 as shown. Trailer 30 can further include a strip of sandpaper 103 on portion 41 adjacent a front end of deck 40 to minimize any slipping and sliding by a user of trailer 30 that is climbing upon or descending from deck 40 adjacent the front end of deck 40. Right axle support 104 and left axle support 105 are removably mounted to deck 40 via holes 46. Right axle support 104 and left axle support 105 receive therein a wheel axle, a roller axle, or any other rear axles of a greensmower secured upon deck 40 to thereby deflect any tree, signs, etc. that may otherwise damage the rear axle(s) of the greensmower as trailer 30 is being transported by vehicle 22.

Referring to FIGS. 7A and 7B, latch assembly 80 includes a right latch support 81, a right latch bracket 82, a left latch support 85, and a left latch bracket 86. Right latch support 81 and left latch support 85 are preferably removably mounted to deck 40 via holes 45 (FIG. 3A). Right latch support 81 has a notch 81a positioned at a top end of right latch support 81, and left latch support 85 has a notch 85a positioned at a top end of left latch support 85. Right latch bracket 82 and left latch bracket 86 are preferably rotatably coupled to right latch support 82 and left latch support 86, respectively, by a shaft 89. Right latch bracket 82 has a notch 82a positioned at a rear end of right latch bracket 82, and left latch bracket 86 has a notch 86a positioned at a rear end of left latch bracket 86.

Still referring to FIGS. 7A and 7B, a clevis pin 83a is preferably affixed to right latch support 81, and perpendicularly and inwardly extended therefrom. A clevis pin 83b is preferably affixed to right latch bracket 82, and perpendicularly and inwardly extended therefrom. A spring 84 is preferably mounted to clevis pin 83a and clevis pin 83b to bias notch 82a toward notch 81a to thereby define a right expandable slot 80a therebetween. Right latch bracket 82 has a foot release 82b at a front end of right latch bracket 82 to enable a user of trailer 30 to expand slot 80a as formed by notch 81a and notch 82a. In an alternative embodiment, the present invention contemplates a right openable closed slot in lieu of right expandable slot 80a by further biasing notch 82a toward notch 81a to thereby form a closed cavity therebetween.

Still referring to FIGS. 7A and 7B, a clevis pin 87a is preferably affixed to left latch support 85, and perpendicularly and inwardly extended therefrom. A clevis pin 87b is preferably affixed to left latch bracket 86, and perpendicularly and inwardly extended therefrom. A spring 88 is preferably mounted to clevis pin 87a and clevis pin 87b to bias notch 86a toward notch 85a to thereby define a left expandable slot 80b therebetween. Left latch bracket 86 has a foot release 86b at a front end of left latch bracket 86 to enable a user of trailer 30 to expand slot 80b as formed by notch 85a and notch 86a. In an alternative, embodiment, the present invention contemplates that a left openable closed slot in lieu of left expandable slot 80b by further biasing notch 86a toward notch 85a to thereby form a closed cavity therebetween.

Figure 9A:
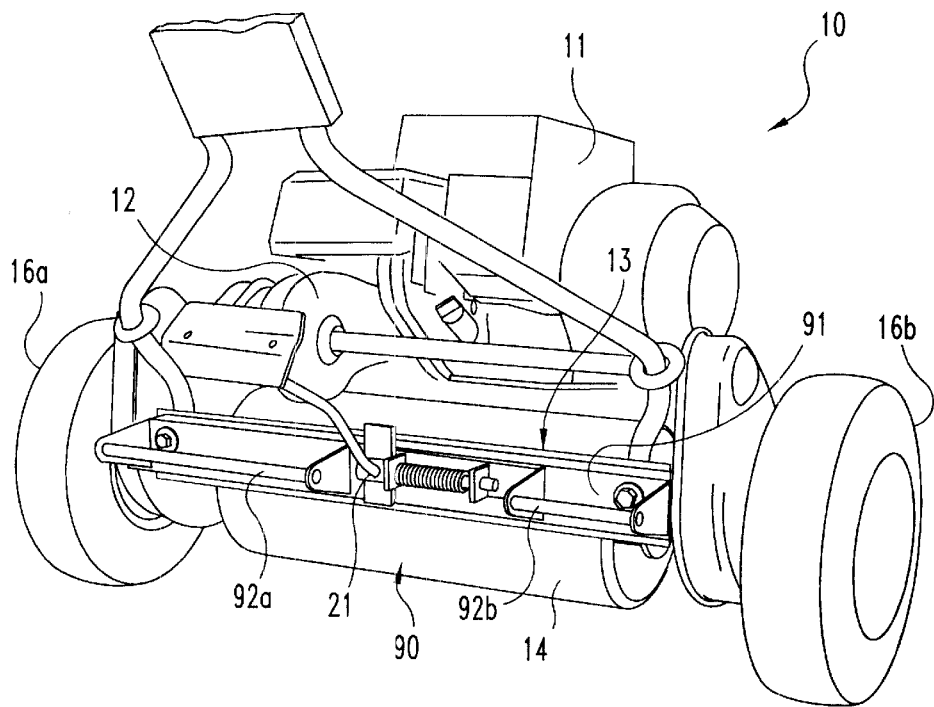
FIG. 9A is a rear and left side perspective view of the FIG. 8A brace removably mounted to the FIG. 1A greensmower.
Figure 9B:
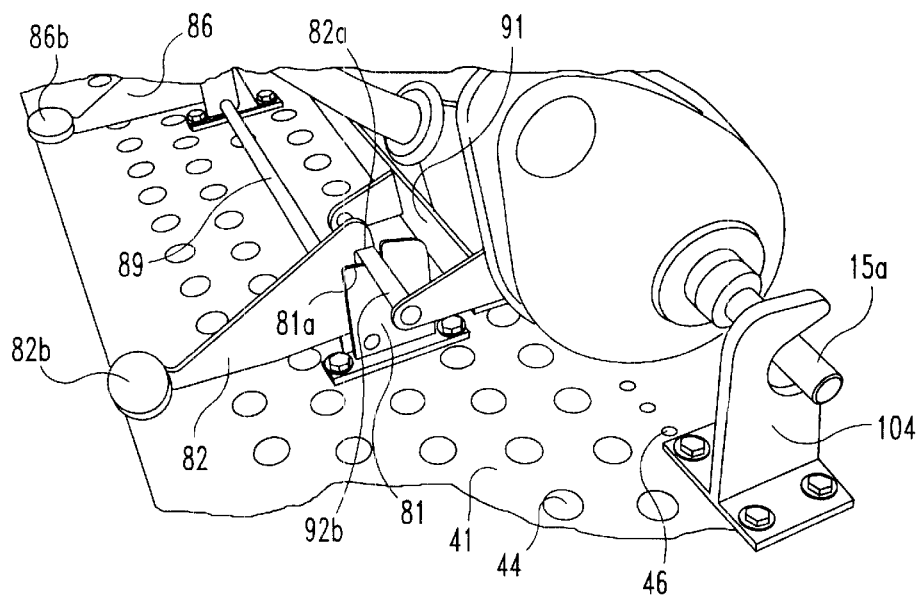
FIG. 9B is a partial top and right side perspective view of the FIG. 7A latch assembly and the FIG. 8A brace securing the FIG. 1A greensmower to the FIG. 3A deck.

Referring to FIGS. 6A and 9A, brace 90 includes a bar 91, a right shaft 92a, and a left shaft 92b. Bar 91 is constructed to be adjoined to frame 13 of greensmower 10. Preferably, bar 91 is removably mounted to a rear end of frame 13 as shown in FIG. 9A. Right shaft 92a is preferably affixed to and parallelly spaced from a right end of bar 91 by a plate 93a and a plate 93b. Left shaft 92b is preferably affixed to and parallelly spaced from a left end of bar 91 by a plate 93c and a plate 93d. Right shaft 92a and left shaft 92b are longitudinally aligned and spaced from each other to enable a kickstand 21 of greensmower 10 to be removably mounted therebetween. The present invention contemplates that bar 91 is constructed to be adjoined to greensmower 10 and any other similarly configured models of greensmowers. Thus, a maintenance crew of a golf course can therefore procure a brace 90 for each procured greensmower 10 and a brace 90 for each similarly configured and procured greensmower model. It is to therefore be appreciated that each brace 90 can continually be removably mounted to a procured greensmower 10 or similarly configured greensmower model to thereby save time and expense for transporting the procured greensmowers. The dimensions of a particular model of a greensmower can vary, e.g. the dimensions of frame 13 of greensmower 10 can vary. Accordingly, the present invention contemplates that bar 91 be comparably dimensioned to a rear end of a frame of a greensmower to which bar 91 will be removably mounted upon. Consequently, if a maintenance crew of a golf course has procured a plurality of greensmowers 10 with frames 13 of varying dimensions, the maintenance crew can therefore procure a plurality of braces 90 with bars 91 of varying and comparable dimensions.

Referring to FIGS. 2B, 3C, 9A, and 9B, an exemplary securing of greensmower 10 to deck 40 will now be described herein. First, ramp 50 is placed in the extended position as shown in FIG. 2B. Second, greensmower 10 is positioned at a rear end of ramp 50 with brace 90 facing trailer 30. Third, greensmower 10 is rolled up ramp 50 onto deck 40 with only rear roller 14 contacting deck 40 and ramp 50 to thereby, as previously explained in connection with FIG. 3C, prevent damage to cutting reel drive 17 and bed knife 18 due to physical contact with deck 40 and/or ramp 50, and prevent an alteration in an alignment of vertical adjustment mechanisms of greensmower 10. Finally, a user of trailer 30 downwardly presses foot release 82b to sufficiently expand right expandable slot 80a (FIGS. 7A and 7B) to position left shaft 92b therein, and then releases foot release 82b to secure left shaft 92b therein. Antecedently, concurrently, or subsequently, a user of trailer 30 downwardly presses foot release 86b to sufficiently expand left expandable slot 80b to position right shaft 92a therein, and then releases foot release 86b to secure right shaft 92a therein. A secured greensmower 10 is aligned upon deck 40 as best shown in FIG. 3C. A left wheel axle 15a of greensmower 10 is positioned within a notch of right axle support 104, and right wheel axle 15b of greensmower 10 is positioned within a notch/h of left axle support 105.

Figure 8B:
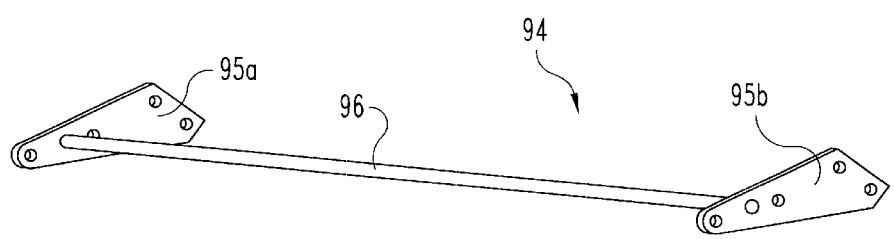
FIG. 8B is a rear, top, and left side perspective view of a second embodiment of a brace in accordance with the present invention.
Figure 10:
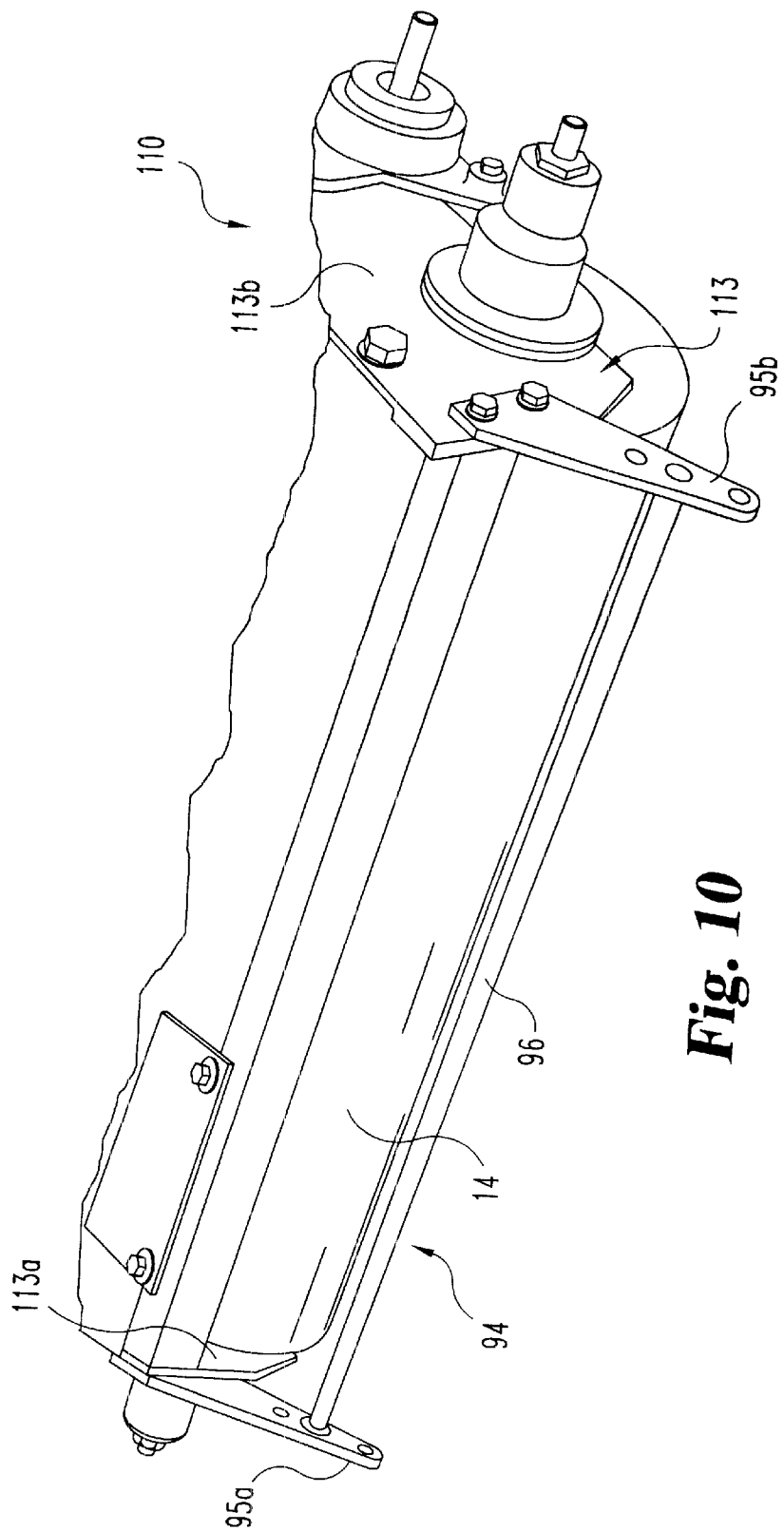
FIG. 10 is a rear and left side perspective view of the FIG. 8B brace removably mounted to a partial rear and left side perspective view of a second embodiment of a conventional greensmower.

Referring to FIGS. 8B and 10, brace 94 includes a right side plate 95a, a left side plate 95b, and a shaft 96 between right side plate 95a and left side plate 95b. Shaft 96 is preferably affixed to and perpendicular to right side plate 95a and left side plate 95b. Right side plate 95a is constructed to be removably mounted to a left side 113b of a frame 113 of a greensmower 110, and left side plate 95b is constructed to be removably mounted to a right side 113a of a frame 113 as shown in FIG. 10. The present invention contemplates that right side plate 95a and left side plate 95b are constructed to be adjoined to greensmower 110 and any other similarly configured models of greensmowers. Thus, a maintenance crew of a golf course can therefore procure a brace 94 for each procured greensmower 110 and a brace 94 for each similarly configured and greensmower model. It is to therefore be appreciated that each brace 94 can continually be removably mounted to a procured greensmower 110 or similarly configured greensmower model to thereby save time and expense for transporting the procured greensmowers. The dimensions of a particular model of a greensmower can vary, e.g. the dimensions of frame 113 of greensmower 110 can vary. Accordingly, the present invention contemplates that right side plate 95a, left side plate 95b, and/or shaft 96 be comparably dimensioned to a rear end of a frame of a greensmower to which right side plate 95a and left side plate 95b will be removably mounted upon. Consequently, if a maintenance crew of a golf course has procured a plurality of greensmowers 110 with frames 113 of varying dimensions, the maintenance crew can therefore procure a plurality of braces 94 with right side plate 95a, left side plate 95b, and/or shaft 96 of varying and comparable dimensions.

Figure 8C:
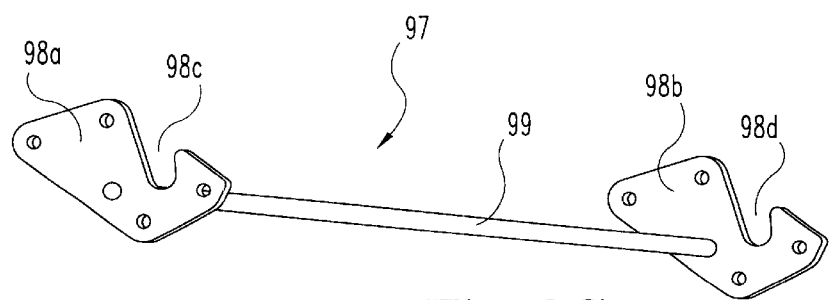
FIG. 8C is a rear, top, and right side perspective view of a third embodiment of a brace in accordance with the present invention.

Referring to FIG. 8C, brace 97 includes a right side plate 98a, a left side plate 98b, and a shaft 99 between right side plate 98a and left side plate 98b. Shaft 99 is preferably affixed to and perpendicular to right side plate 98a and left side plate 98b. Right side plate 98a and left side plate 98b are constructed to be removably mounted to a frame of a model and models of greensmowers having an axle or axles extending from the frame adjacent a rear end of the frame. The extended axle(s), wheel or roller, are positioned with a notch 98c of right side plate 98a and a notch 98d of left side plate 98b. The present invention contemplates that right side plate 98a and left side plate 98b are constructed to be adjoined to each model of a greensmower having a rear axle or axles adjacent a rear end of a frame of the greensmower (hereinafter "rear axle greensmower(s)"). Thus, a maintenance crew of a golf course can therefore procure a brace 97 for each procured rear axle greensmower. It is to therefore be appreciated that each brace 97 can continually be removably mounted to a procured rear axle greensmower to thereby save time and expense for transporting the procured rear axle greensmowers. The dimensions of a particular model of a rear axle greensmower can vary. Accordingly, the present invention contemplates that right side plate 98a, left side plate 98b, and/or shaft 99 be comparably dimensioned to a rear end of a frame of a rear axle greensmower to which right side plate 98a and left side plate 98b will be removably mounted upon. Consequently, if a maintenance crew of a golf course has procured a plurality of rear axle greensmowers of varying dimensions, the maintenance crew can therefore procure a plurality of braces 97 with right side plate 98a, left side plate 98b, and/or shaft 99 of varying and comparable dimensions.

Figure 11:
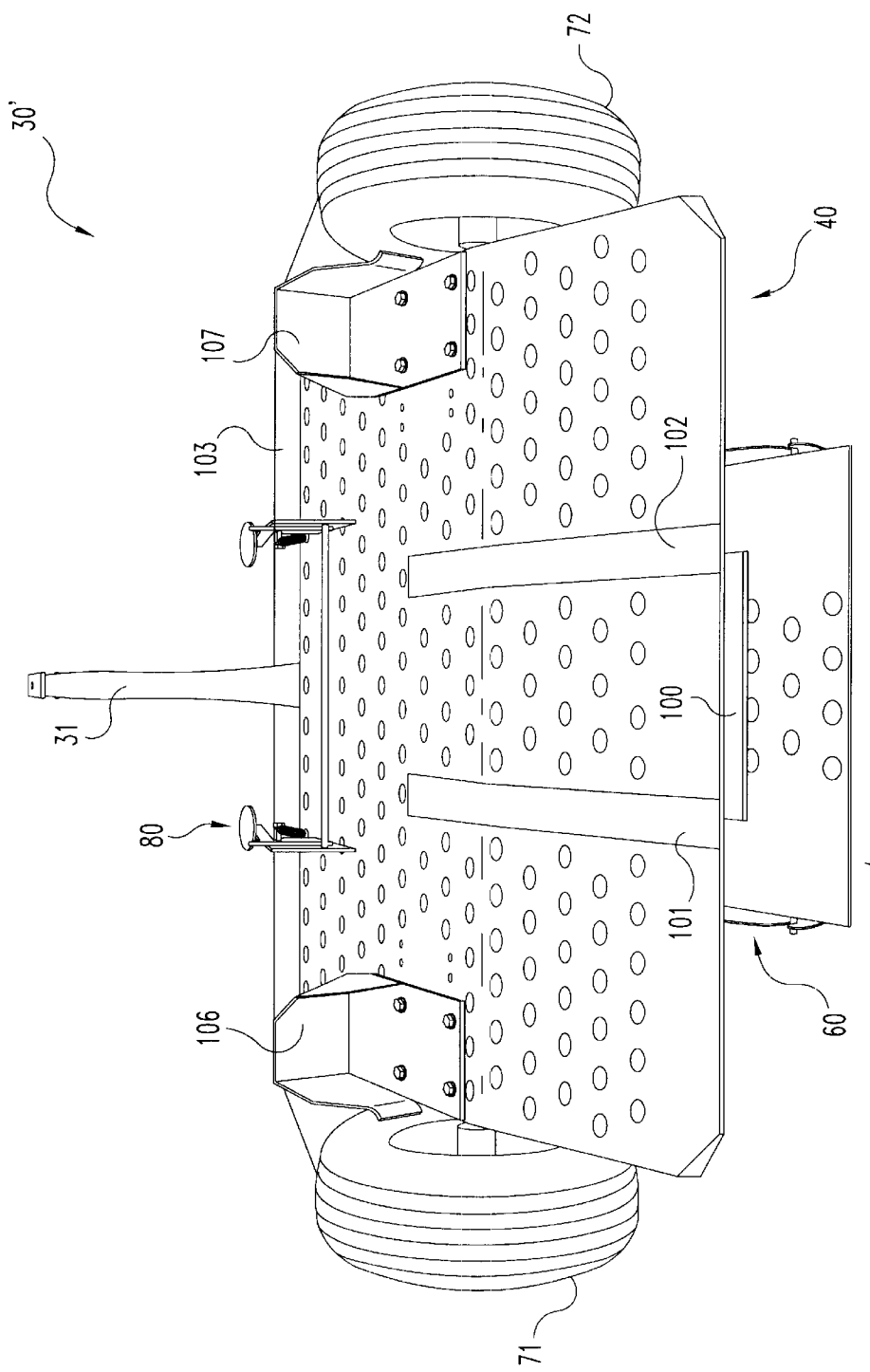
FIG. 11 is a rear and top perspective view of a second embodiment of a trailer in accordance with the present invention for transporting a variety of models of greensmowers.

Referring to FIG. 11, a second embodiment of a trailer 30' in accordance with the present invention is shown. Trailer 30' is a modified version of trailer 30 with wheel support 106 being removably mounted to deck 40 in lieu of axle support 104 (FIGS. 2A and 2B), and wheel support 107 being removably mounted to deck 40 in lieu of axle support 105 (FIGS. 2A and 2B). It is to be appreciated that a right wheel and a left wheel of a greensmower are seated on wheel support 106 and wheel support 107 when the greensmower is supported by and secured to deck 40. For both trailer 30 and trailer 30', it is preferred that deck 40, ramp 50, ramp support 60, right bumper 73 (FIG. 2A), left bumper 74 (FIG. 2B), right side plate 75 (FIG. 6A), left side plate 76 (FIG. 6C), right wheel axle assembly 77 (FIG. 6B), left wheel axle assembly 78 (FIG. 6C), latch assembly 80 (FIGS. 7A and 7B, except for spring 84 and spring 88), brace 90 (FIG. 8A), brace 94 (FIG. 8B), and brace 97 (FIG. 8C) are all manufactured from steel and have a powder coated finish.

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. A trailer for transporting a variety of models of greensmowers, said trailer comprising:
 a deck for supporting a greensmower; and
 a universal coupler for securing the greensmower to said deck, said universal coupler including
  a latch assembly adjoined to said deck, and
  a first brace being securable by said latch assembly,
  wherein said first brace is constructed to be adjoined to a first set of at least one model of greensmowers; and
  wherein said latch assembly includes:
   a first latch support adjoined to said deck, said first latch support having a first notch;
   a first latch bracket rotatably adjoined to said first latch support, said first latch bracket having a second notch;
   a first clevis pin adjoined to said first latch support;
   a second clevis pin adjoined to said first latch bracket; and
   a first spring adjoined to said first clevis pin and said second clevis pin,
   wherein said first notch is biased toward said second notch to define a first expandable slot therebetween.

2. The trailer of claim 1 wherein said latch assembly further includes a foot release adjoined to said first latch bracket whereby said second notch call be displaced away from said first notch to thereby expand said first expandable slot.

3. The trailer of claim 1 wherein said latch assembly further includes:
- a second latch support adjoined to said deck, said second latch support having a third notch;
- a second latch bracket rotatably adjoined to said second latch support, said second latch bracket having a fourth notch;
- a third clevis pin Adjoined to said second latch support;
- a fourth clevis pin adjoined to said second latch bracket; and
- a second spring adjoined to said third clevis pin and said fourth clevis pin,
  - wherein said third notch is biased toward said fourth notch to define a second-expandable slot therebetween.

4. A trailer for transporting a variety of models of greensmowers, said trailer comprising:
- a deck for supporting a greensmower; and
- a universal coupler for securing the greensmower to said deck, said universal coupler including
  - a latch assembly adjoined to said deck, and
  - a first brace being securable by said latch assembly,
  - wherein said first brace is constructed to be adjoined to a first set of at least one model of greensmowers; and
- a first wheel rotatably coupled to said deck;
- a first bumper adjoined to said deck and adjacent a first tread of said first wheel;
- a second wheel rotatably coupled to said deck; and
- a second bumper adjoined to said deck and adjacent a second tread of said second wheel, and,
- wherein said first bumper includes:
  - a first plate adjacently facing said first tread of said first wheel, and
  - a second plate adjoined to said first plate, said second plate facing away from said first tread of said first wheel; and
- wherein said second bumper includes:
  - a third plate adjacently facing said second tread of said second wheel, and
  - a fourth plate adjoined to said third plate, said fourth plate facing away from said second tread of said second wheel.

5. A trailer for transporting a variety of models of greensmowers, said trailer comprising:
- a deck for supporting a greensmower; and
- a universal coupler for securing the greensmower to said deck, said universal coupler including
  - a latch assembly adjoined to said deck, and
  - a first brace being securable by said latch assembly,
  - wherein said first brace is constructed to be adjoined to a first set of at least one model of greensmowers,
  - a ramp slidably adjoined to said deck, said ramp being movable between a retracted position and an extended position; and
  - a ramp prop adjoined to said deck,
  - wherein a portion of said ramp is upheld by said ramp prop adjacent said deck when said ramp is in said extended position.

6. The trailer of claim 5 further comprising:
- a ramp support adjoined to said deck, said ramp support including a first groove and a second groove;
- a first clevis pin adjoined to said ramp; and
- a second clevis pin adjoined to said ramp,
  - wherein said first clevis pin slidably extends through said first groove and said second clevis pin slidably extends through said second groove to thereby slidably adjoin said ramp to said deck.

7. A trailer for transporting a variety of models of greensmowers, said trailer comprising:
- a deck for supporting a greensmower; and
- a universal coupler for securing the greensmower to said deck, said universal coupler including
  - a latch assembly adjoined to said deck, and
  - a first brace being securable by said latch assembly,
  - wherein said first brace is constructed to be adjoined to a first set of at least one model of greensmowers,
  - a ramp;
  - a ramp support slidably adjoining said ramp to said deck whereby said ramp is movable along said ramp support between a retracted position and an extended position, said ramp support including a first notch and a second notch;
  - a first peg adjoined to said ramp; and
  - a second peg adjoined to said ramp,
  - wherein said first peg is positioned within said first notch and said second peg is positioned within said second notch when said ramp is in said retracted position.

8. A trailer for transporting a variety of models of greensmowers, said trailer comprising:
- a deck for supporting a greensmower;
- a universal coupler adjoined to said deck and configured to be adjoined to the greensmower, said universal coupler for securing the greensmower to said deck;
- a first wheel rotatably coupled to said deck;
- a first bumper adjoined to said deck and adjacent a tread of said first wheel;
- a second wheel rotatably coupled to said deck; and
- a second bumper adjoined to said deck and adjacent a tread of said second wheel; and
- wherein said first bumper includes:
  - a first plate adjacently facing said tread of said first wheel, and
  - a second plate adjoined to said first plate, said second plate facing away from said tread of said first wheel; and
- wherein said second bumper includes:
  - a third plate adjacently facing said tread of said second wheel, and
  - a fourth plate adjoined to said third plate, said fourth plate facing away from said tread of said second wheel.

9. A trailer for transporting a variety of models of greensmowers, said trailer comprising:
- a deck for supporting a greensmower; and
- a universal coupler for securing the greensmower to said deck, said universal coupler including
  - a latch assembly adjoined to said deck, and
  - a first brace being securable by said latch assembly,
  - wherein said first brace is constructed to be adjoined to a first set of at least one model of greensmowers,
  - wherein said latch assembly includes:
    - a first latch support adjoined to said deck, said first latch support having a first notch;
    - a first latch bracket movably adjoined to said first latch support, said first latch bracket having a second notch; a first spring adjoined to said first latch support and said first latch bracket wherein said first notch is biased toward said second notch to define a first expandable slot therebetween.

10. The trailer of claim 9 wherein said latch assembly further includes:
a second latch support adjoined to said deck, said second latch support having a third notch;
a second latch bracket movably adjoined to said second latch support, said second latch bracket having a fourth notch;
a second spring adjoined to said second latch support and said second latch bracket,
wherein said third notch is biased toward said fourth notch to define a second expandable slot therebetween.

11. A trailer for transporting a variety of models of greensmowers, said trailer comprising:
a deck for supporting a greensmower; and
a universal coupler for securing the greensmower to said deck, said universal coupler including
a latch assembly adjoined to said deck, and
a first brace being securable by said latch assembly,
wherein said first brace is constructed to be adjoined to a first set of at least one model of greensmowers,
a first latch support adjoined to said deck, said first latch support having a first stop surface;
a first latch bracket movably adjoined to said first latch support, said first latch bracket having a second stop surface;
a spring adjoined to said first latch support and said first latch bracket,
wherein said first stop surface is biased toward said second stop surface to define a first expandable slot therebetween.

* * * * *